United States Patent [19]

Beeghly

[11] 4,246,493

[45] Jan. 20, 1981

[54] ANNUNCIATOR

[75] Inventor: Bruce R. Beeghly, Youngstown, Ohio

[73] Assignee: The Economy Engine Company, Youngstown, Ohio

[21] Appl. No.: 923,591

[22] Filed: Jul. 12, 1978

Related U.S. Application Data

[63] Continuation-in-part of Ser. No. 826,389, Aug. 22, 1977, abandoned.

[51] Int. Cl.[2] .................................................. H02J 9/06

[52] U.S. Cl. ........................................ 307/66; 307/116; 340/520; 123/198 DC

[58] Field of Search .................. 307/66, 117, 118, 120, 307/154; 340/181, 147 CN, 223, 520; 123/198 R, 198 D, 198 BD, 198 DC, 198 C; 180/103 R; 73/116

[56] References Cited

U.S. PATENT DOCUMENTS

| | | | |
|---|---|---|---|
| 3,264,613 | 8/1966 | Stolle | 340/415 |
| 3,960,011 | 1/1976 | Renz | 73/116 |
| 4,074,255 | 2/1978 | Munt | 340/756 |
| 4,136,660 | 1/1979 | Palmer | 123/198 DC |

*Primary Examiner*—L. T. Hix

*Assistant Examiner*—S. D. Schreyer

*Attorney, Agent, or Firm*—Webb, Burden, Robinson & Webb

[57] ABSTRACT

A shut-down and first-out annunciator device comprising sensor switches that change condition when a fault occurs. Logic and display circuits provide a digital readout indicative of a fault condition. Shut-down means are responsive to a shut-down signal produced by the logic circuit and produce a latching signal for the display. A first power supply powers all sections during normal operation and a second power supply powers the display and shut-down circuits after shut-down.

14 Claims, 5 Drawing Figures

ANNUNCIATOR

RELATED CASE

Figure 1:
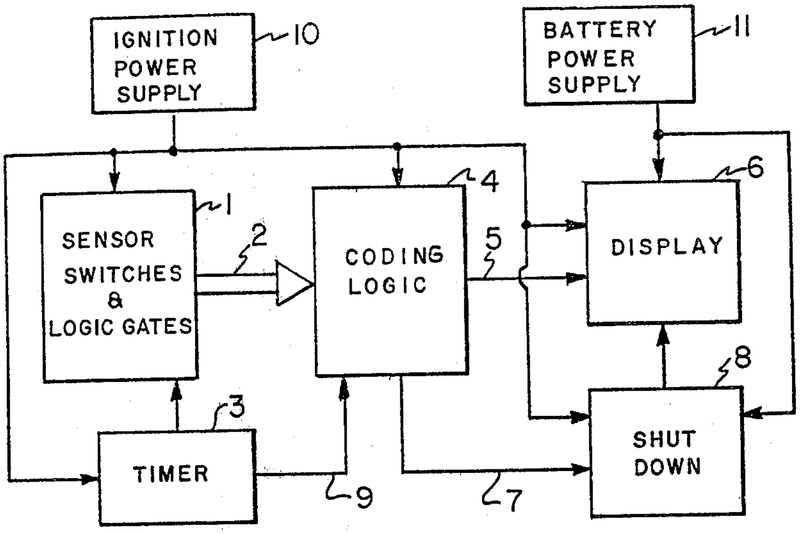

This application is a continuation-in-part of Application Ser. No. 826,389, filed Aug. 22, 1977, abandoned.

This invention relates to a first-out annunciator and shut-down device useful for monitoring and shutting-down a remotely located internal combustion engine or the like. Related devices have been proposed and are described in patent literature. Some of the prior devices are electromechanical and some are electronically implemented (See, for example, United States Patents Nos. 3,965,469 and 3,960,011). This application relates to an improved electronically operated first-out annunciator and shut-down device.

It is an advantage according to this invention that the device draws very low current under all operating conditions, thereby enabling it to be operated from the self-powered ignition of the engine being monitored and a small long-life battery.

It is a further advantage of this invention that a numeral corresponding to the sensor switch first sending a fault signal is displayed on a digital display device.

It is yet another advantage according to this invention that all sensors can be tested without shutting-down or causing shut-down of the engine with which it is associated.

Briefly, according to this invention there is provided a shut-down and first-out annunciator device for an internal combustion engine or the like comprising a plurality of parallel connected sensor switches. The sensor switches change condition when a fault condition occurs in the monitored device, such as low oil pressure, high coolant temperature, etc. A digital logic circuit converts the change in condition on one of the sensor switches into a binary output indicative of the sensor switch which has changed condition. The logic circuit also creates a shut-down signal when any sensor switch changes condition. A digital display means converts the binary signal produced by the logic circuit into a digital readout and includes the usual BCD-to-seven-segment numeral drivers which have a latch terminal for fixing the output when the latch terminal is provided a low signal. A shut-down circuit is responsive to the shut-down signal produced by the logic circuit for triggering an electronic or relay switching device which grounds the ignition system, for example. The shut-down circuit also creates the latching signal for latching the digital display.

According to preferred embodiments, the shut-down circuit can be disabled to permit testing of the individual sensor switches without shut-down of the engine and latching of the display. It is also preferred that the shut-down circuit converts the shut-down signal produced by the logic circuit into a continuous latch and shut-down signal with a slight time delay between the start of the logic circuit shut-down signal and the continuous latch and shut-down signal. It is also preferred according to this invention that the shut-down circuit be provided with a delay circuit for providing a signal which terminates the current drain through the control element of the shut-down switch.

The shut-down and first-out annunciator device according to this invention includes a first power supply. This may be the ignition system, for example, supplying power from the storage capacitor of a capacitive discharge ignition system or from the primary of an inductive break-type ignition system. The first power supply operates the sensor switches, the logic circuit, the display means and the shut-down means during normal operation. The annunciator device is also provided with a second power supply circuit comprising a battery for operating the display means in the shut-down circuit after shut-down. In this way, after shut-down, the numeral corresponding to the first-out sensor switch remains displayed on the display and latched by the shut-down circuit.

Figure 2:
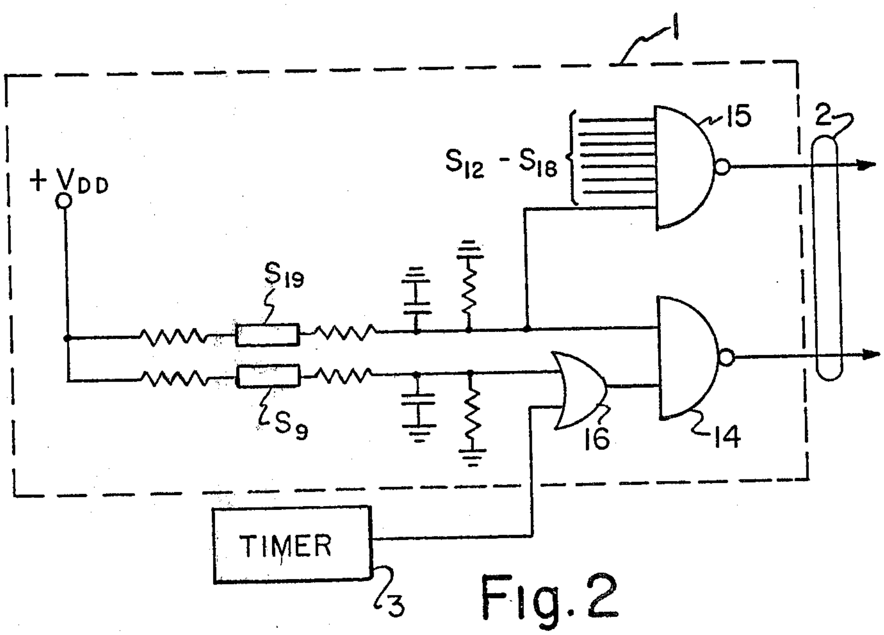
Figure 3:
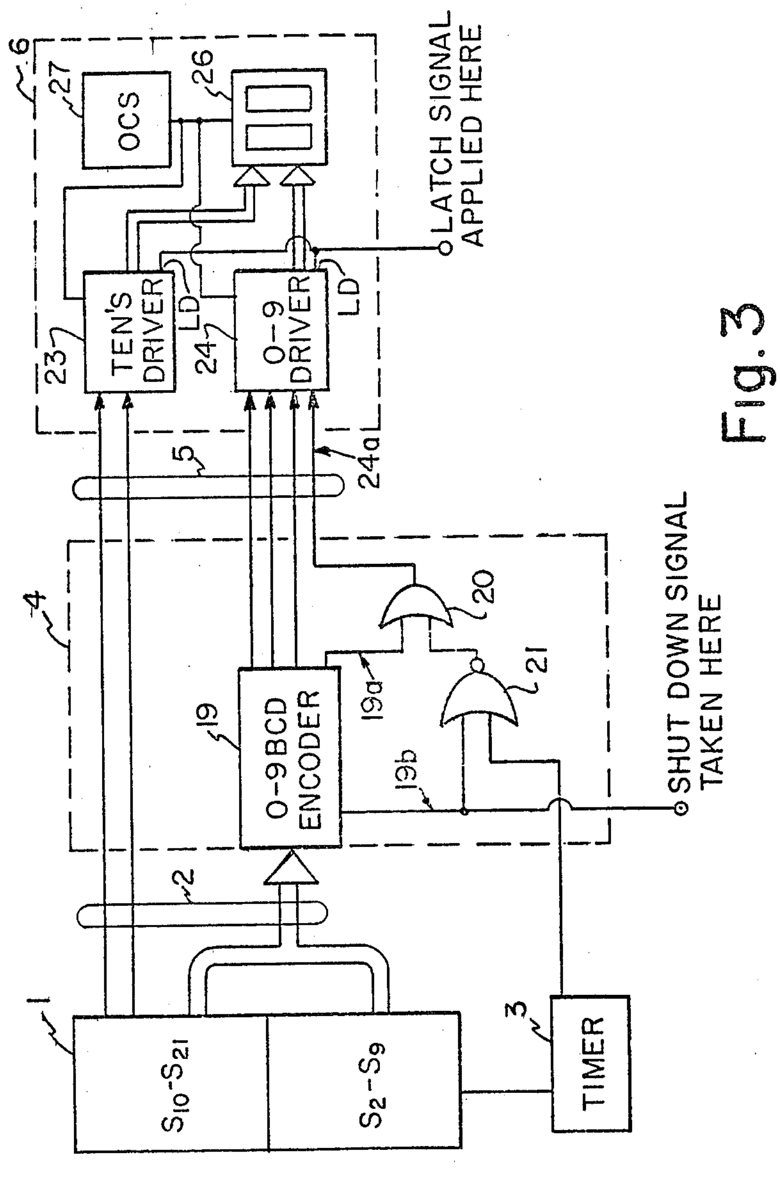
Figure 4:
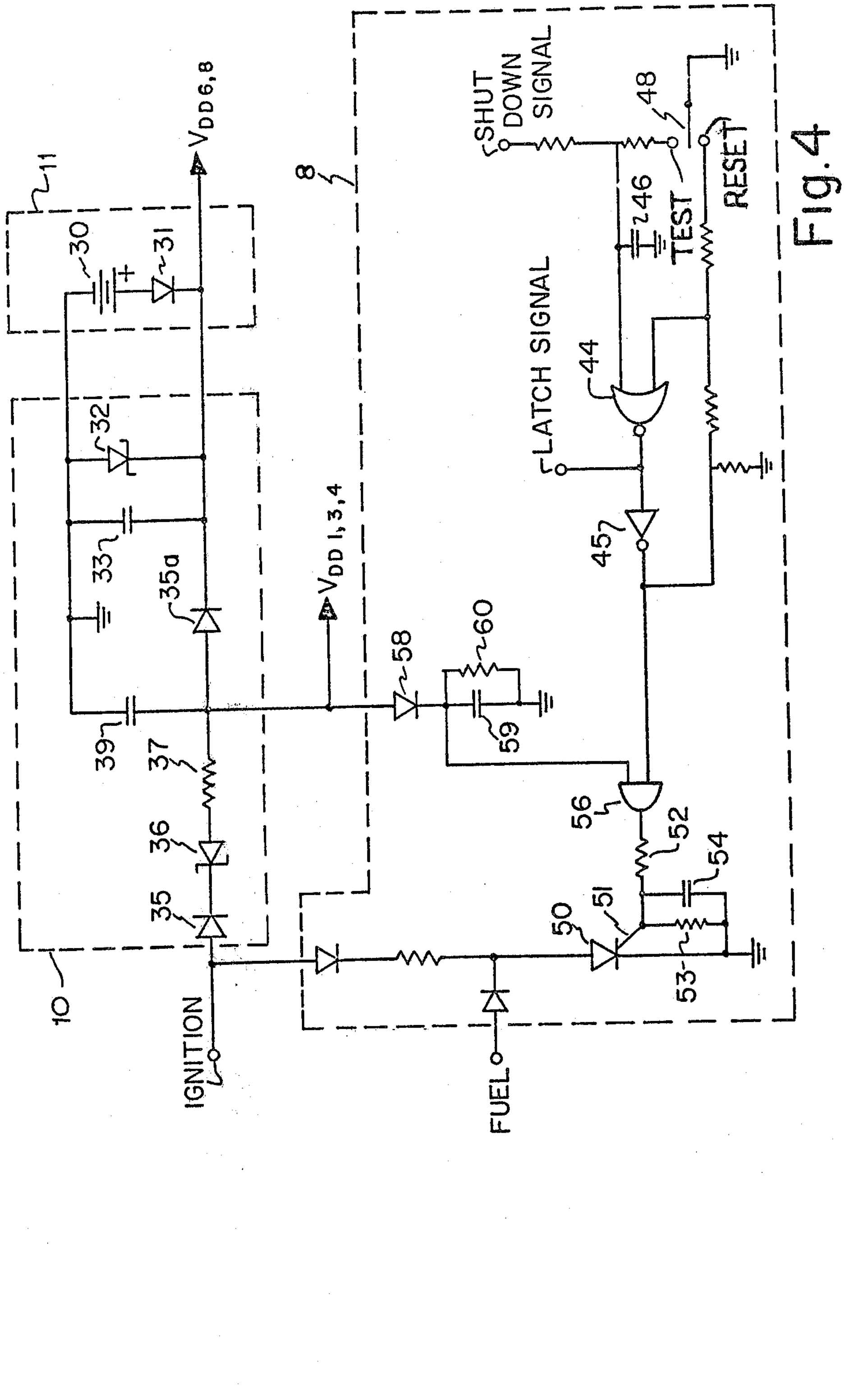
Figure 5:
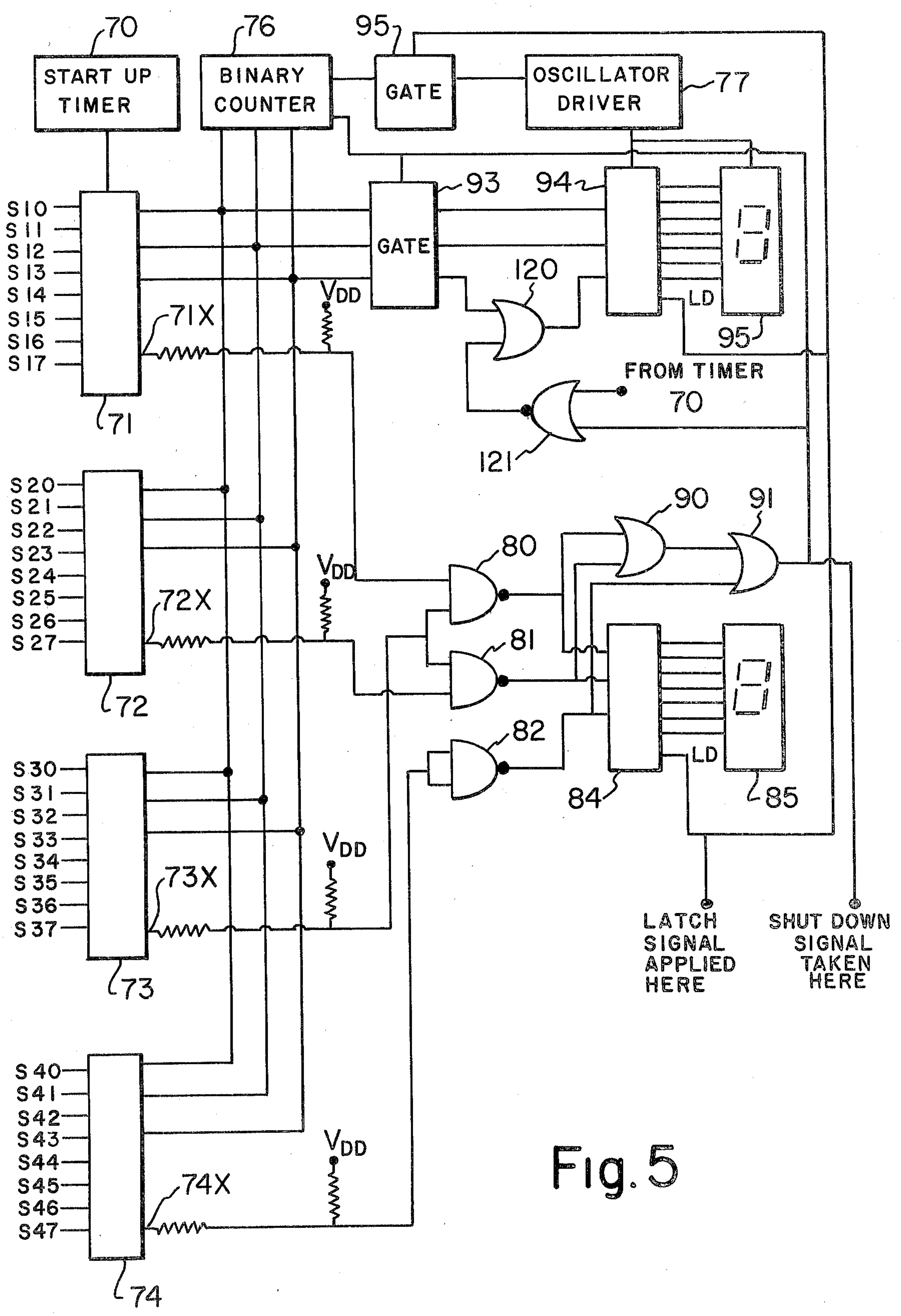

Further features and other objects and advantages of this invention will become clear from the following detailed description made with reference to the drawings in which FIG. 1 is an overall schematic illustrating the interrelationship of the various sections of the shut-down and first-out annunciator device according to this invention, FIG. 2 is a partial detail of the sensor switches section, FIG. 3 is a schematic illustrating the logic section and the display section in more detail than shown on FIG. 1, FIG. 4 is a circuit diagram illustrating the first power supply circuit, the second power supply circuit and the shut-down circuit according to this invention, and FIG. 5 is a circuit diagram of part of a circuit useful in an alternate embodiment wherein a large number of sensor switches can be monitored.

Referring now to FIG. 1, there is shown a block diagram illustrating the interconnection of various sections of the annunciator and shut-down device according to this invention. Section 1 comprising the sensor switches and logic gates provides discrete outputs for each of the plurality of activted sensor switches (i.e., producing a fault signal). Hence, the output of section 1 is a bus 2 having a plurality of lines. In the particular emboodiment discussed hereafter, the bus contains 12 lines (0–9 and 10, 20) to carry a decimal signal indicative of any one of at least 20 sensor switches. During start-up, it is necessary to ignore the fault signals produced by certain sensors (i.e., oil pressure) and hence, timer 3 outputs a disable signal that is used to cancel the fault signal of certain sensors at start-up.

The coding logic section 4 of the device converts the binary decimal signals on bus 2 into binary coded decimal (BCD) signals. In the embodiment explained hereafter the sensors are assigned decimal numerals 2 through 21. The bus carries these numbers to the logic circuit which encodes them to BCD. The output bus 5 of the logic circuit comprises at least 6 lines (4 for "units" and 2 for "tens") for a 20 sensor annunicator. The BCD signal is applied by bus 5 to the display section 6. The logic circuit performs other functions. It outputs a shut-down signal on line 7 if any sensor switch generates a fault signal. The shut-down signal is applied to the shut-down section 8. The logic circuit generates a "0" output when the timer is shutting-out selected sensor fault signals. For this, line 9 connects timer 3 to logic section 4. The logic section generates a "1" when there is no longer a disable signal outputted from the timer and no sensor switches have changed condition, that is are producing fault signals. To display only the first sensor to fault (on shut-down any number of sensor switches will change condition), the display is latched by a latch signal produced by the shut-down section 8.

The device has two power supply sections. In a preferred embodiment, the first power supply 10 derives energy from the ignition during operation and provides power to the entire circuit during operation of the engine. The battery power supply 11 provides power to the display section 6 after shut-down to maintain the digital display and to the shut-down section to maintain the latching signal.

The display section basically comprises a square wave oscillator, two drivers and a two place liquid crystal display or LCD (one for the tens place and one for the units place). The LCD is the preferred display means due to its very low current requirement.

The shut-down circuit 8 basically comprises a triggerable switch shut as an SCR, triac or electromechanical relay which grounds the ignition circuit when its control element is energized. The shut-down circuit also produces a continuous shut-down and latching signal in response to the temporary shut-down signal produced by the logic section, which continuous signals can only be terminated by a reset signal.

FIG. 2 illustrates the operation of the sensor switches section with reference to only two sensors (one disabled during start-up and the other not disabled during start-up). A sensor switch $S_9$, say an oil pressure sensor, normally outputs a high but outputs a low signal when the oil pressure is below a safe level. A sensor switch $S_{19}$, say a coolant temperature sensor, normally outputs a high but outputs a low signal when temperature of a coolant is too high. Basically each sensor has associated therewith a normally closed switch that opens on detection of a fault discontinuing the $V_{DD}$ voltage as an output. Normally open switches may be easily adopted to perform the same function. The timer outputs a high during the start-up period which may be varied according to the application from a few seconds to a number of minutes. During normal start-up $S_9$ outputs a low and $S_{19}$ a high. The high output of $S_{19}$ is applied to both the two-input NAND 14 and the eight-input NAND 15. If the remaining inputs to the NAND gates are high then their outputs are low. During start-up the output of sensor $S_9$ is low. The low is applied to OR gate 16. A high is applied to the other input of OR gate 16 by the timer during the start-up period. Since at least one input of the OR gate 16 is high, the output is high. The output of NAND 14 is low, unaffected by sensor $S_9$. If, during or after start-up, $S_{19}$ detects a fault and opens transferring a low to NANDs 14 and 15, the output of the sensor section is a decimal signal "19" i.e., a high on the output of NAND 15 and a high on the output of NAND 14. If, after start-up, when the output of timer 3 has gone low, the sensor $S_9$ has not yet outputted a high (or goes from high to low) the low applied to NAND 14 will output a decimal signal "9" i.e., a high on the output of NAND 14. In actual practice, the sensor switch section 1 includes sensors assigned $S_2$ to $S_{21}$. No $S_1$ is assigned for reasons that will become apparent later in this description. Only sensor switches $S_9$ and $S_{19}$ were shown in FIG. 2 for simplicity.

FIG. 3 illustrates the coding logic circuit 4 and display section 6. In this embodiment, sensors $S_2$–$S_9$ are chosen to be disabled by the timer 3 during startup; sensors $S_{10}$–$S_{21}$ are unaffected by the timer 3. The input to the logic section is primarily the decimal signal on bus 2. The decimal unit signals are converted to binary with an encoder shown as a single integrated circuit (I.C.) 19. Actually, it is practical to use an eight digit (0–7) binary encoder plus a Quad OR I.C. and one NOR I.C. to construct a 10 digital (0–9) binary encoder. The output from the binary encoder comprises at least four lines (binary "9" reads "1001"). The decimal "tens" do not require a binary encoder circuit for the specific embodiment as the decimal "1" reads binary "01" and the decimal "2" reads binary "10". Since the highest number assigned to a sensor switch in this particular embodiment is $S_{21}$ the binary "tens" encoder is unnecessary. The sensor section 1 outputs a high on one line for sensors 10–19 and on another line for sensors 20–21 (both lines are low for sensors 2–9).

With one exception, the BCD outputs are applied directly to the drivers 23 and 24 in the display section. The binary "units" output line 19*a* is first applied to OR gate 20. The output of the OR 20 is applied to the driver 24. Thus a high on line 19*a* always results in a high on the driver "units" line 24*a*.

The following is an explanation of how the logic section outputs binary coded decimal "00" during the start-up when the timer is outputting a high to cause disregard of sensors $S_2$–$S_9$ and how the logic section outputs a binary coded decimal "01" when all the sensors are on line: At start-up, if there are no fault signals from sensors $S_{10}$ to $S_{21}$ there will not be a high on the shut-down signal line 19*b* which is usually taken from the group select terminal of the encoder 19. The output of the timer is high, however. Hence, the output of NOR 21 is low and the input to the binary units terminal of the driver is low. Thus the drivers cause "00" output on the two column LCD display. When the timer stops outputting the high signal, the NOR 21 outputs a high signal which causes the OR gate 20 output to go high. Thus driver 24 has a high on its "units" input line 24*a* and the resultant output on the display is "01". Now if a fault signal is sent by one of the sensor switches, it is necessary to remove the high caused by NOR 21 from the binary units terminal of the driver 24. This takes place because the shut-down signal 19*b* applied to one input of NOR 21 goes high thus driving the output low. Thus line 24*a* is at this point controlled solely by the "units" output line 19*a* from the BCD encoder 19.

The drivers convert the binary input to a seven-segment LCD display signal on two seven-line buses. Each seven-segment display signal is applied to a seven-segment display in the digital display. A square wave oscillator 27 powers the drivers 23 and 24 and the LCD digital display 26. A low signal applied to the LD (latch display) terminal of the drivers 23 and 24 latches the display to the output present at the time the latch signal was applied.

With reference to FIG. 4, the shut-down 8 and power supply circuits 10 and 11 are described. Battery supply circuit 11 comprises a battery 30 and a protective diode 31. The battery will only supply energy to the display section 6 and the shut-down section 8 when the ignition power supply is no longer capable of outputtting power. During operation of the engine when the power supply 10 is operating the voltage at the cathode of diode 31 is higher than the battery voltage and therefore the battery cannot discharge. The battery operates only when the engine is shut-down to supply about 1 milliamp for approximately 15 seconds and then only 15 microamps thereafter. This is accomplished by having the battery supply only that part of the circuit that latches the display and the display itself. It is also accomplished by terminating the current to the control terminal of the electronic switch as explained hereafter. Available lithium nonrechargeable batteries can give life of five years under these circumstances and the use of such batteries or the like is contemplated.

The power supply which supplies all the various sections of the shut-down and first-out annunciator device according to this invention during engine operation is comprised of diode 35, zener diode 36, resistor 37 and capacitor 39 for supply line $V_{DD}$1, 3, 4 and diode 35a, capacitor 33 and zener diode 32 for supply line $V_{DD}$6, 8. The input to the power supply 10 is the ignition, for example, the storage capacitor of a capacitive discharge ignition system or primary winding of an inductive break-type ignition system. Because the device is designed to use very little power at all times, it is possible to power the circuit from self-powered ignition systems, that is those having no auxiliary power source (such as a battery). These ignition systems are powered by DC current generators, alternators and magnetos.

The shut-down section receives the shut-down signal produced by the logic circuit. This signal is created by the logic circuit when a sensor switch changes condition. It is a temporary signal in the sense that since the logic circuit is unpowered after shut-down, it must cease after shut-down. The shut-down section produces a continuous shut-down and latch signal from the temporary shut-down signal received from the logic circuit. This is accomplished by NOR gate 44 and INVERTER 45. The shut-down signal is applied to one input of the NOR gate. The output of the NOR gate is applied to the INVERTER. The output of the INVERTER is fedback through a resistor to the other input of the NOR gate 44. The feedback circuit is grounded through a very large resistor. Hence, during normal operation when no shut-down signal is received from the logic section both inputs to the NOR gate are low and the output is therefore high. The output of the NOR gate 44 is applied to the latch terminals on the drivers in the display section placing the drivers in the unlatched condition. When a shut-down signal is received, a high is applied to one input of NOR gate 44, thus driving the output low. The low output is inverted by the INVERTER 45 and fedback to the other input to the NOR gate 44 thus latching the output of the NOR gate 44 low. The NOR gate 44 output remains low notwithstanding the shut-down signal received from the logic circuit may no longer be high. The latched low output of NOR gate 44 is applied to the latching terminal on the drivers in the display section thus latching the digital output so as to display the numeral corresponding to the first-out sensor switch. To assure that the numeral of the faulting sensor switch is displayed before the latched signal is applied, a small delay capacitor 46 is placed between the input terminal receiving the shut-down signal on the NOR gate 44 and ground.

A mechanical reset and test switch 48 is provided to ground the feedback input to the NOR gate 44 through a resistor thereby unlatching the NOR gate 44 and INVERTER 45. The same mechanical switch 48 can be used to ground the input to the NOR gate 44 which receives the shutdown signal thus providing test condition. When the switch is in the test position, the various sensor switches can be checked without shutting-down the engine or latching the display. An operator, when the switch 48 is in the test position, can manually change the condition of individual sensor switches and observe the numeral corresponding to that switch displayed on the digital output. The above functions of switching the described points to ground may also be accomplished by electronic means.

The basic shut-down element of the shut-down circuit of FIG. 4 is electronic switch 50 which may be, for example, an SCR. The SCR is connected with its cathode grounded and its anode connected through diodes to the ignition system and the electrical fuel system if desirable. When the SCR is triggered on by a positive going signal applied to its control electrode 51, a circuit to ground is provided for the ignition and fuel systems thus shutting-down the engine. Resistors 52, 53 and capacitor 54 are all common elements in the control electrode circuit of the SCR and prevent it from being triggered by transients. The output of INVERTER 45 could be applied directly to the control electrode 51 since the output of 45 is a positive going signal at shut-down; however, output of 45 is continuous and therefore there would be a continuous current drain through the control electrode of SCR 50. A delayed shut-down circuit is therefore imposed between the gate or control electrode 51 and the output of INVERTER 45 comprising AND gate 56. The output of the INVERTER 45 is applied to one input of the AND gate 56. The output of the AND 56 is connected through resistor 52 to the control electrode 51 of the SCR 50.

A diode 58, capacitor and bleed resistor 60 comprise a delay circuit. The capacitor 59, during engine operation becomes charged and a signal taken between the diode 58 and the capacitor 59 is a high which is applied to the other input to the AND gate 56. During normal operation, the output of the INVERTER 45 is a low. (The output of the delay circuit is high.) Hence, the output of AND 56 is low maintaining the control electrode of the SCR 50 in the nonconducting condition. When a latched shut-down signal is outputted from the INVERTER 45, both inputs to AND gate 56 are high, therefore the output is high triggering the SCR 50 into conduction. After some period of time determined by the time constant of the resistor 60 and the capacitor 59, preferably about 15 seconds to insure engine shut-down, the capacitor 15 discharges and therefore a low is applied on one terminal of AND gate 56. This in turn causes the output of AND gate 56 to go low thereby preventing a current drain through the control electrode 51 of SCR 50.

As is known to anyone skilled in the art, the various NOR, OR, NAND, AND and INVERTER gates as well as the BCD encoders and the timer, oscillator and LCD drivers are available from various manufacturers as integrated circuits. It is also well known that different combinations of the logic gates can be functional equivalents of the specific combinations shown in this specification. Set forth in the following table is a listing of the various components which applicant has used in constructing one actual embodiment of this invention.

| ELEMENT | COMMERCIAL I.C. |
|---|---|
| OR Gate | Motorola MC 14071 |
| NOR Gate | Motorola MC 14001 |
| NAND Gate | Motorola MC 14011 |
| AND GATE | Motorola MC 14081 |
| | or MC 14572 (NAND & INV.) |
| 8-Input NAND | Motorola MC 14068 |
| | or RCA CD 4048 |
| Encoder | Motorola MC 14532 |
| Driver | Motorola MC 14543 |
| Timer | Motorola MC 14541 |
| Oscillator | RCA CD 4047 |
| Display | Hamlin 3906 |

An alternate embodiment of this annunciator is illustrated in FIG. 5. In this embodiment, each parallel sensor switch ($S_{10}$–$S_{17}$; $S_{20}$–$S_{27}$; $S_{30}$–$S_{37}$; and $S_{40}$–$S_{47}$) is associated with one input of a multiplexer (71, 72, 73, 74) which in response to a BCD input connects one of said multiplexer inputs to a common output (71*x*, 72*x*, 73*x*, 74*x*). A suitable multiplexer has been found to be the Motorola MC14051. The BCD bus supplying binary inputs to the multiplexers is controlled by a binary counter 76, clocked by oscillator divider 77. A suitable binary counter has been found to be Motorola MC14520. The oscillator 77 may also supply power for driving drivers 84 and 94 and liquid crystal displays 85 and 95. Hence, each multiplexer continually and sequentially poles the parallel inputs. During start-up, the start-up timer 70 disables one multiplexer.

The grounding of any sensor switch, say $S_{30}$, causes the common output 73x of the associated multiplexer 73 to be pulled down. It is normally high due to a pull-up resistor, for example, as shown in the Figure connected to $V_{DD}$. This low is inverted and passed through the coding logic comprising NAND gates 80, 81, and 82 to the tens display driver 84. Thus the tens display driver is coded, in this example, to cause a three to be displayed on a seven-segment display 85. Any high output of the coding network (80, 81 and 82) results in a high at the output of OR gate 91 as a result of the manner in which OR gates 90 and 91 are connected. Thus, a temporary shut-down signal is produced. This signal is applied to gate 93 allowing the BCD output of the binary counter to be applied to the units display driver. The shut-down signal is also applied to binary counter 76 to hold the count.

The NOR gate 121 and OR gate 120 work in the same manner as described above for NOR gate 21 and OR gate 20 to apply a binary coded signal resulting in a "00" display during the start-up when the timer is outputting a high to cause disregard of sensors $S_{10}$ to $S_{17}$ and to provide a binary coded decimal signal resulting in a "01" display when all the sensors are on-line. The remainder of the circuit is as shown in FIG. 4. Hence a temporary shut-down signal is converted into a latching signal which causes the drivers 84, 94 to latch the display corresponding to the first-out sensor switch. The latch signal is applied to the gate 95 to isolate the binary counter 76 from the oscillator 77.

Having thus defined my invention in the detail and particularity required by the Patent Laws, what is desired protected by Letters Patent is set forth in the following claims:

1. A shut-down and first-out annunciator device for an internal combustion engine or the like comprising:

a. a plurality of parallel connected sensor switches which change condition when a fault condition occurs, b. a logic circuit which converts the change in condition on one of the plurality of sensor switches into a binary digital output indicative of the sensor switch which has changed condition and for creating a temporary shut-down signal, c. a digital display means for converting the binary digital signal produced by the logic circuit into a digital readout, d. shut-down means responsive to the temporary shut-down signal for creating a continuous signal for latching the digital display and triggering a shut-down switch having a control element by application of the signal to said control element, e. a first power supply circuit outputting energy only during normal operation to power the sensor switches, logic means, display means and shut-down means during normal operation, f. a second power supply circuit comprising a battery for powering during and after shut-down a portion of the device including the display means and shut-down means but excluding the sensor switches, and g. a delay circuit which shortly after shut-down interrupts the continuous signal as applied to the said control element whereby the current drain through the control element of the triggerable switch is terminated.

2. A shut-down and first-out annunciator device according to claim 1 further including a timer producing a signal during start-up which prevents the logic circuit from recognizing the condition of one or more sensor switches.

3. A shut-down and first-out annunciator device according to claim 2 wherein each sensor switch in a first group of sensor switches is connected to one input of a plurality of two input OR gates, each sensor switch in a second group of sensor switches is connected to one input of a plurality of two input NAND gates, each sensor switch in the second group also being connected to one of the plurality of inputs to a multiple input NAND gate, the outputs of said OR gates being connected to one of the other inputs of said two input NAND gates, said timer being connected to the other input of all of said OR gates, whereby the outputs of all the NAND gates comprise a digital signal in a number system higher than binary indicative of the sensor switch changing condition and the first group of sensor switches produces no such outputs during the period while said timer outputs a signal.

4. A shut-down and first out annunciator device according to claim 2 wherein each sensor switch in a first group of sensor switches is connected to a first multiplexer and each sensor switch in at least one other group of sensor switches is connected to a mutliplexer associated with said at least one other group, a binary counter for outputting binary select signals to said multiplexers to pole the sensor switches, the common output of each of said multiplexers being applied to a decoding network to control a higher place display in the digital display and to produce a temporary shut-down and latch signal, the output of said binary counter also gated to the digital display in response to the temporary shut-down to control a units place display.

5. A shut-down and first-out annunciator device according to claim 2 wherein the logic circuit outputs a selected binary digital signal during the start-up period, another selected binary digital signal after the start-up when no fault condition exists or a binary digital signal indicative of a sensor switch which has changed condition.

6. A shut-down and first-out annunciator device according to claim 5 wherein the logic circuit comprises means for converting the output of the sensor switches into binary coded decimal signals and also means for producing a group select signal whenever there exists output from any sensor switch, a two input NOR gate to which the timer input and group select signal are applied, a two input OR gate to which the output of the NOR gate and the lowest binary terminal of the converting means are connected whereby the logic circuit will output a BCD "0" during the start-up period and a BCD "1" during the period thereafter if no fault condition exists.

7. A shut-down and first-out annunciator device according to claim 6 wherein the feedback terminal of the NOR gate is placed at ground to reset the shut-down circuit.

8. A shut-down and first-out annunciator device according to claim 6 wherein the terminal of the NOR gate receiving the temporary shut-down signal may be placed at ground whereby each sensor switch may be tested without latching the digital display or causing shut-down.

9. A shut-down and first-out annunciator device according to claim 1 wherein the shut-down means in response to said temporary shut-down signal from the logic means creates said continuous shut-down and latching signal such that it can only be terminated by a reset signal.

10. A shut-down and first-out annunciator device according to claim 9 wherein the shut-down means further comprising a two input NOR gate, the output of which is connected to an INVERTER, said temporary shut-down signal being applied to one of the inputs on the NOR gate, a feedback circuit from the output of said INVERTER being applied to the other input of said NOR gate such that a high temporary shut-down signal latches the NOR gate output low and the INVERTER output high.

11. A shut-down and first-out annunciator device according to claim 10 comprising a small grounded capacitor fixed to that input of the NOR gate to which the temporary shut-down signal is applied whereby a delay in the creation of the latched output of the NOR gate is effected.

12. A shut-down and first-out annunciator device according to claim 9 wherein the shut-down means imposes a slight delay between the start of the temporary shut-down signal produced by the logic circuit and the continuous shut-down and latching signal, thus insuring time for the display means to display the digital read-out indicative of the sensor switch that has changed condition.

13. A shut-down and first-out annunciator device according to claim 9 wherein a test signal disables the shut-dowm means whereby each sensor switch may be tested without latching the digital display or causing shut-down.

14. A shut-down and first-out annunciator device according to claim 1 wherein said shut-down means further comprises a two input AND gate, one of said AND gate inputs connected to a line which goes high as a result of the continuous shut-down signal, the output of the AND gate connected to means for applying a trigger signal to the control element of the switch when the output of the AND gate goes high, a delay circuit comprising a normally charged capacitor and a bleed resistor in parallel therewith which circuit when the capacitor is charged outputs a high signal, the output of the delay circuit being applied to the other input of said AND gate whereby when the capacitor has discharged sometime after shut-down, the output of the AND circuit goes low thereby terminating current drain through the control element of the said switch.

* * * * *